United States Patent [19]

Olson

[11] Patent Number: 5,506,057

[45] Date of Patent: Apr. 9, 1996

[54] THIN LAMINATED HEATED GLASS FACE PLY FOR AIRCRAFT WINDSHIELDS

[75] Inventor: Jan B. Olson, Playa del Rey, Calif.

[73] Assignee: Sierracin Corporation, Sylmar, Calif.

[21] Appl. No.: 259,874

[22] Filed: Jun. 15, 1994

Related U.S. Application Data

[63] Continuation-in-part of Ser. No. 157,954, Nov. 24, 1994, Pat. No. 5,493,912.

[51] Int. Cl.$^6$ .............................. B32B 27/00; B60J 1/00; B64C 1/14

[52] U.S. Cl. ...................... 428/425.6; 428/213; 428/332; 428/432; 156/99; 156/102; 156/108; 244/129.3

[58] Field of Search ........................ 428/34, 212, 425.6, 428/192, 213, 332, 423.1, 432, 415; 156/99, 102, 108; 244/129.3; 264/1.7; 296/84.1

[56] References Cited

U.S. PATENT DOCUMENTS

| | | | |
|---|---|---|---|
| 3,388,032 | 6/1968 | Saunders | 161/183 |
| 4,072,782 | 2/1978 | Kramer et al. | 428/409 |
| 4,073,986 | 2/1978 | Keslar et al. | 428/38 |
| 4,081,581 | 3/1978 | Littell, Jr. | 428/138 |
| 4,103,070 | 7/1978 | Ammons | 428/412 |
| 4,364,786 | 12/1982 | Smith, Jr. et al. | 156/99 |
| 4,504,341 | 3/1985 | Radzwill et al. | 156/102 |
| 4,645,146 | 2/1987 | Hall | 244/129.3 |
| 4,666,758 | 5/1987 | Hunter | 428/212 |
| 4,810,583 | 3/1989 | Brown et al. | 428/34 |
| 4,817,347 | 4/1989 | Hand et al. | 52/171 |
| 4,836,314 | 6/1989 | Rupprecht et al. | 177/210 |
| 4,855,260 | 8/1989 | Dumbaugh, Jr. et al. | 501/66 |
| 4,921,759 | 5/1990 | Orain et al. | 428/424.4 |
| 5,039,573 | 8/1991 | Bravet et al. | 428/423.1 |
| 5,047,272 | 9/1991 | Hassel et al. | 428/40 |
| 5,443,912 | 8/1995 | Olson | 428/425.6 |

FOREIGN PATENT DOCUMENTS

| | | |
|---|---|---|
| 2310979 | 10/1976 | France . |
| 8910916 | 10/1989 | Germany . |

OTHER PUBLICATIONS

Aircraft Engineering, vol. 48, No. 7, Jul. 1976, pp. 4–8. R. S. Bruce 'The Design and Development of Glass Windscreens for Wide–Bodied Aircraft'.

Abstract number 94308687.6.

*Primary Examiner*—Donald J. Loney
*Attorney, Agent, or Firm*—Christie, Parker & Hale

[57] ABSTRACT

A laminated face ply for aircraft windshields provides improvement in window performance. The laminated face ply incorporates an outer glass face ply and an inner glass ply of thin, chemically strengthened glass having substantially identical thicknesses of about 0.026". A first urethane interlayer bonds the outer face ply to the inner ply. The thickness of the first urethane interlayer is sufficient to accommodate thermal stresses arising between the outer ply and inner ply, but sufficiently thin to limit deflection of the outer ply for impact resistance. A second urethane interlayer is employed to bond the inner glass ply to a structural ply of the windshield. The second interlayer has a thickness substantially identical to the first urethane interlayer to accommodate thermal stresses arising between the inner glass ply and the structural ply of the windshield while similarly limiting deflection of the inner ply with respect to the structural ply of the windshield for improved impact resistance.

7 Claims, 4 Drawing Sheets

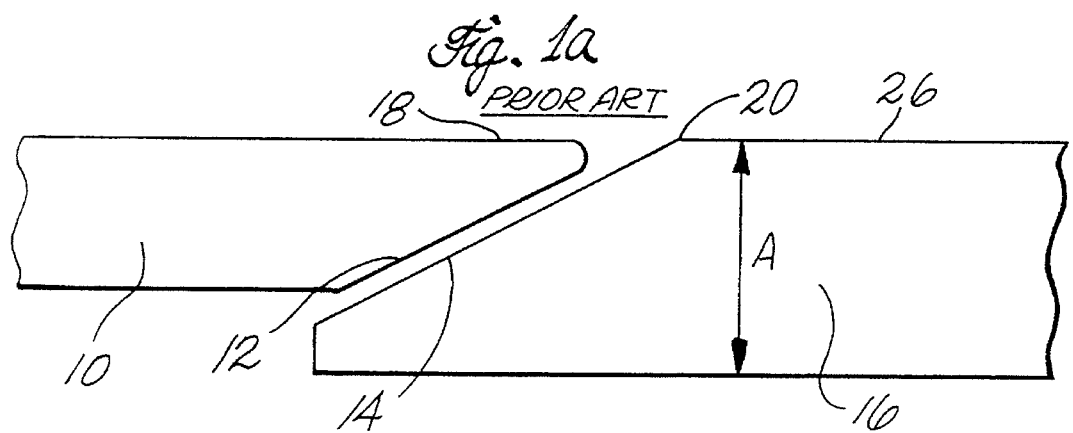
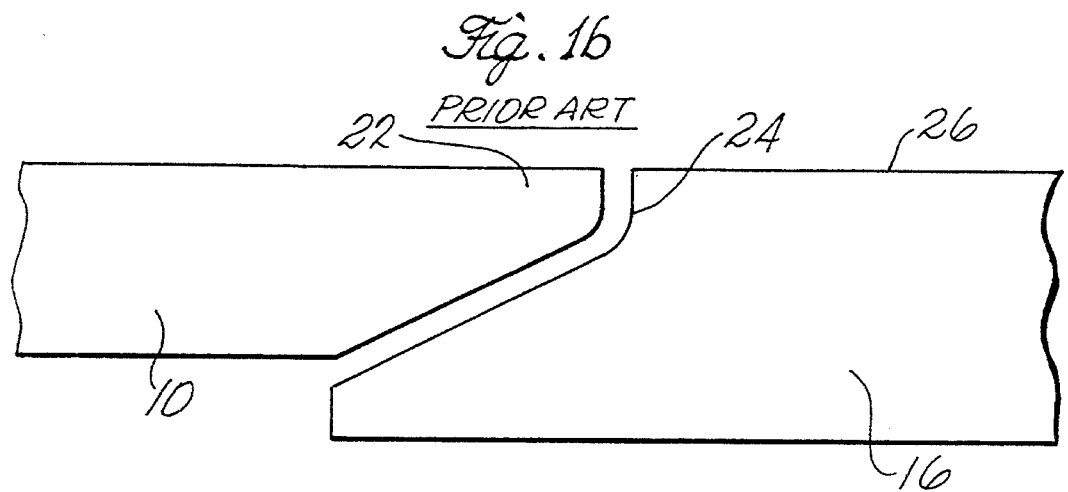
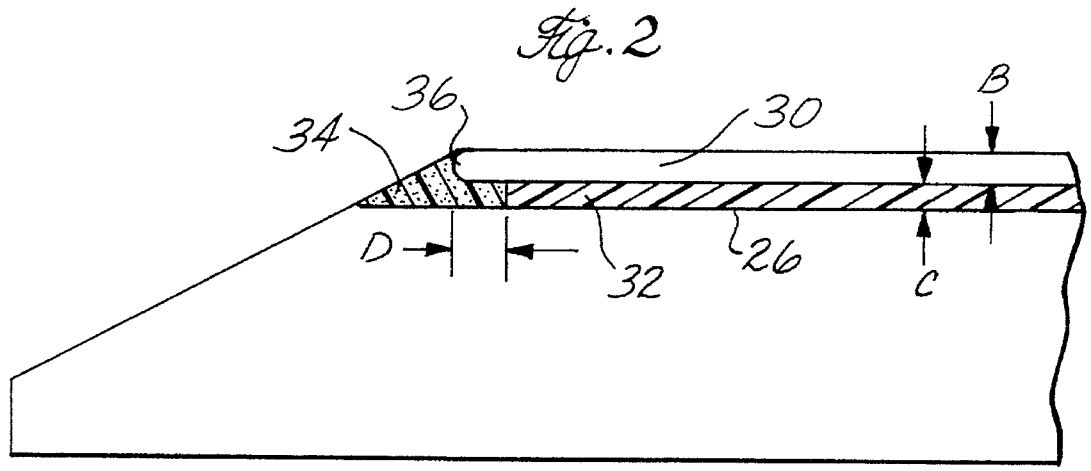

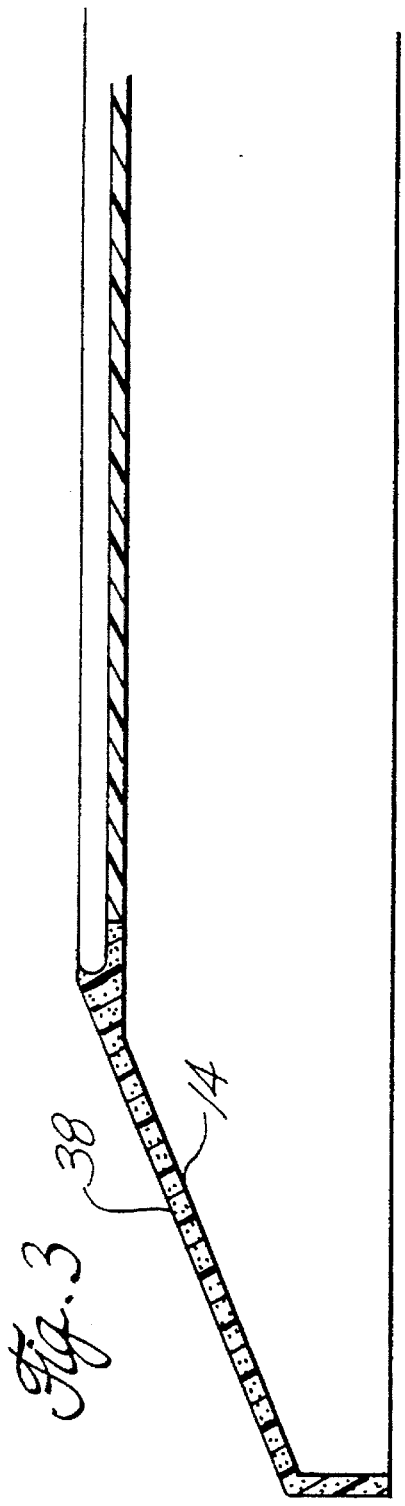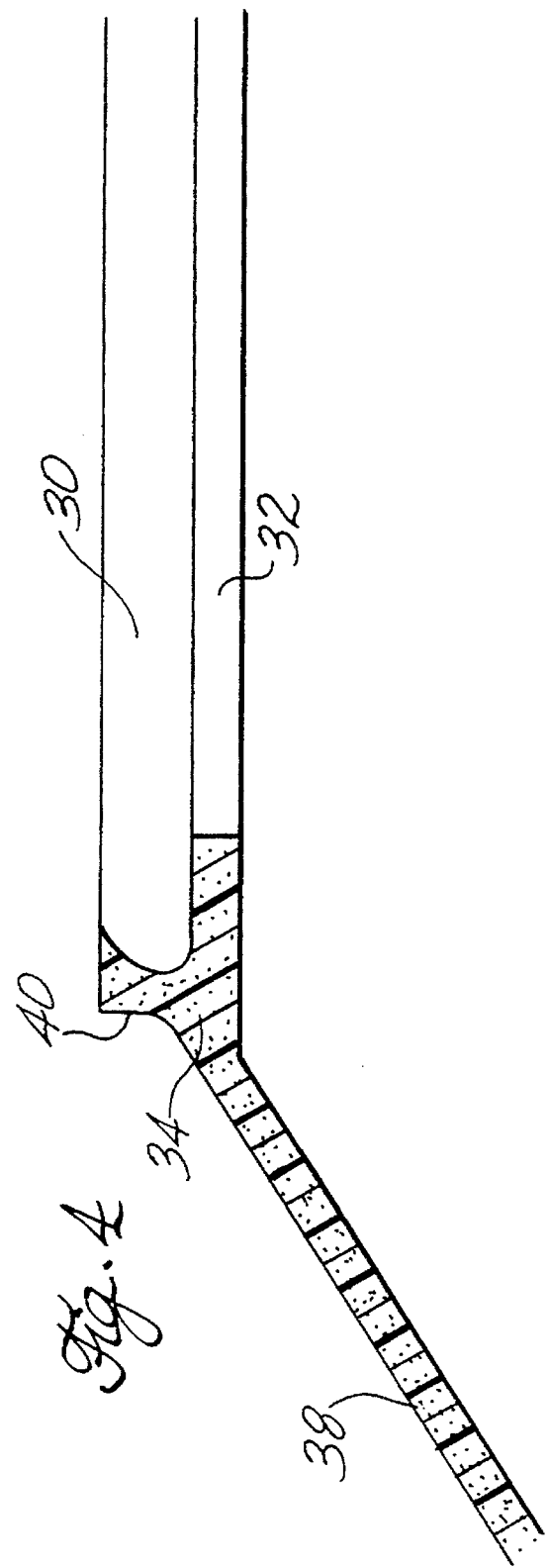

THIN LAMINATED HEATED GLASS FACE PLY FOR AIRCRAFT WINDSHIELDS

RELATED APPLICATION INFORMATION

The present application is a continuation-in-part of U.S. patent application Ser. No. 08/157,954 filed on Nov. 24, 1993 now U.S. Pat. No. 5,493,912 entitled Laminated Environmental Protection Layer for Acrylic Aircraft Windows.

BACKGROUND OF THE INVENTION

1. Field of the Invention

The present invention relates to laminated glass face ply assemblies incorporating integral heating elements for aircraft windshields. More particularly, the present invention provides an outer protective laminate of thin chemically strengthened glass, or highly cross-linked acrylic plies laminated to the acrylic surface of the aircraft windshield structural layer by a thin urethane interlayer. The outer protective laminate incorporates multiple thin glass layers with thin urethane or other adhesive interlayers configured to incorporate braids or leads for an electrical anti-ice element without structural degradation.

2. Prior Art

Aircraft windows and windshields are typically fabricated using acrylic plastics in homogenous or laminated form or acrylic and glass laminated structures to meet weight and impact resistance requirements. In many of these window configurations, the external layer or surface comprises stretched acrylic plastic. Stretched acrylic provides a tough, reasonably durable finish, however, crazing, pitting, erosion and discoloration of the acrylic surface can be caused by particulates, hail and chemical attack. The toughness gained in stretching the acrylic reduces surface hardness thereby increasing the susceptibility to degradation.

Windshield laminates typically comprise one or more structural layers of glass, stretched acrylic, polycarbonate or other light weight plastic over which a glass face ply of approximately 0.125 inches minimum is laminated. A polyvinyl butyryl (PVB) or other adhesive interlayer of approximately 0.10 to 0.15 inches is employed. In more complex windshields the outer glass face ply is heated using an electrical element for anti-icing. The anti-ice element is applied to the inner surface of the face ply and conductive braid or other conductor is provided for supplying electrical power to the anti-ice element. The braid is typically accommodated within the interlayer thickness thereby avoiding any structural impact to the laminated windshield.

In recent years a worsening problem with aircraft windows has been created by significant volcanic eruptions which not only introduce significant quantities of high particulate ash into the upper atmosphere but also create a corrosive chemical environment severely degrading acrylic aircraft windows. Severe degradation of cabin windows for commercial airline aircraft is exemplary of this problem. Most regular airline travelers can attest to the significant degradation of visual quality in aircraft windows. The windows are crazed and/or pitted, significantly impairing vision. Studies have indicated that chemical attack from volcanically introduced substances at higher altitudes is the major contributing cause to such erosion.

In prior industry practice, airline cabin windows were removed and the exterior surfaces were ground and polished to restore the visual quality of the windows. Typical aircraft window configurations such as those shown in FIGS. 1A and 1B of the drawings had initial representative thicknesses of approximately 0.350±0.015 inches with a minimum structural thickness requirement of 0.280 inches. This provided approximately 0.070 inches for grinding and polishing of the windows during refurbishment. This tolerancing allowed approximately three refurbishments of the window before reaching the minimum structural thickness. This machine grinding and polishing operation depends on flattening these relatively thin panes during the process using vacuum tooling or other means. The much thicker laminated cockpit side windows do not lend themselves to being flattened, so they are limited to less effective hand polishing and premature replacement if the surface damage is too deep to be removed in this manner.

Current atmospheric conditions are resulting in rapid degradation of windows and more frequent repair of the windows as described, which, along with more frequent replacement of aircraft windows due to increased frequency of repair, has created an extensive cost burden for commercial carriers. Consequently, modifications to original windows and a means to accomplish repair of acrylic aircraft windows to reduce damage and eliminate repetitive repair is sought.

Windshield laminates which require significant hail resistance typically employ a relatively thick glass face ply to meet excessive deflection and breakage requirements. In addition, the interlayer thickness of prior art windshields has been determined, at least in part, to accommodate the conductive braid or other contacts for anti-icing elements. A thinner outer face ply would be structurally feasible if a thinner interlayer could be employed to prevent excess deflection during an impact. However, the requirement for anti-ice provisions has not previously been accommodated with a thin face ply laminated system due to the requirement for thin interlayer thickness which will not accommodate the braid or other electrical conductor providing power to an anti-ice element. Machine relief in the underlying polycarbonate/acrylic structural layer to accommodate the braid would produce unacceptable stresses that would compromise bird impact resistance unless significant thickness increases were made in the structural layer thereby obviating the benefit of the thin face ply.

SUMMARY OF THE INVENTION

The present invention comprises a thin laminated structure which replaces the outer glass face ply and interlayer of conventional aircraft windshields, providing a thinner and lighter structure thereby eliminating the shortcomings of the prior art while maintaining the structural integrity required for the windshield laminated structure. The invention accommodates a heating element for anti-icing capability and a braid or other electrical conductor providing power to the anti-ice element. A first thin chemically strengthened glass outer face ply is employed with an anti-ice element applied on the inner surface. A first urethane interlayer of comparable thickness supports the outer glass face ply. A second glass ply of thin chemically strengthened glass is provided on the interface of the first interlayer and a second urethane interlayer of comparable thickness to the second glass ply attaches the entire laminate to the plastic structural ply of the windshield. On the edges adjacent the bus bars, the inner glass ply has a lateral dimension less than the lateral dimension of the outer glass ply with the difference in dimension sufficient to accommodate the width of the braid or other conductor attaching to the anti-ice element. The first and second urethane interlayer are joined peripherally to the inner glass ply by a urethane spacer of substantially identical thickness to the inner glass ply to provide continuity in the laminate on the undercut edges. In alternate embodiments the first interlayer incorporates a thickened peripheral portion accommodating the thickness dimension of the inner glass ply.

As a further advantage of the present invention for curved faceplate applications, processing of the thin laminated face ply of the present invention can be accomplished without preforming of the glass as required by the prior art. A prelamination of the first glass ply, first interlayer, and second glass ply is accomplished by laying up these plies and elastically forming the components on a curved tool set, approximating the curvature of the structural layers of the windshield, using standard vacuum tools in a hot lamination process. The second interlayer is laminated to the face ply as a portion of the prelamination in a first alternative process and is laminated along with the previously described prelamination to the structural plies in a second alternative process.

The present invention overcomes the shortcomings of the prior art while providing significant weight savings. Additionally, the ability to achieve a curved face ply using flat elastically formed glass as opposed to glass preformed using high temperatures significantly reduces tooling and process complexity and enhances the optical properties of the final product by eliminating optical distortion potentially created in forming of thick glass face plies in the prior art. Finally, the present invention produces significantly less shear stress on the heater coating present on the outer glass ply due to the presence of the inner glass ply intermediate the conductive layer and the plastic structural layers. The second interlayer carries the majority of sheer stresses imposed by the plastic structural plies on the laminated outer face ply due to thermal expansion induced during processing or in service and deflection due to pressurization in operating service. In addition, the distribution of impact strength between two thin chemically strengthened glass plies allows thickness and weight reduction over the use of a single glass face ply. The use of two thin glass plies also reduces the amount of thermal expansion present in the face ply itself during operational use of the windshield.

BRIEF DESCRIPTION OF THE DRAWINGS

The present invention is better understood with reference to the accompanying drawings and detailed description wherein:

FIG. 1A and FIG. 1B demonstrate a cross-sectional view of configurations for existing commercial aircraft cabin windows as exemplary of windows on which the present invention may be employed;

FIG. 2 is a cross-sectional view showing a first embodiment of the present invention as implemented on a commercial aircraft cabin window;

FIG. 3 is a cross-sectional view demonstrating a second embodiment of the present invention as incorporated on an aircraft cabin window with extended sealant coverage on machined surfaces of the window;

FIG. 4 is a cross-sectional view demonstrating a third embodiment of the present invention wherein a breakout point matching supporting structure for the window is created using the sealant to further enhance the aerodynamics of the installation;

DETAILED DESCRIPTION

Figure 5:
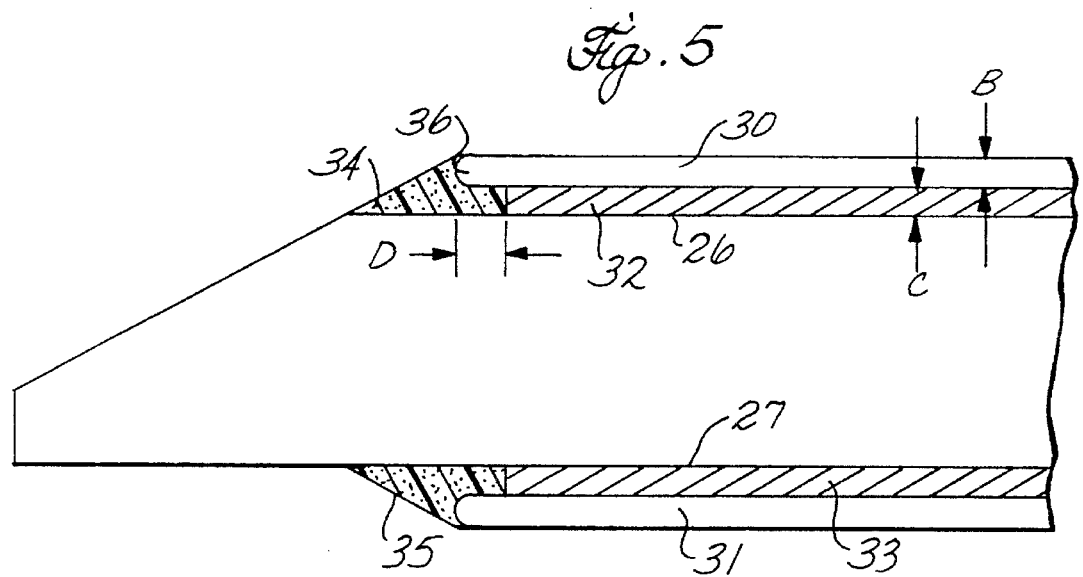
FIG. 5 is a cross-sectional view demonstrating an alternative embodiment of the invention employing an inner balancing lamination.

Referring to the drawings, FIG. 1A shows a cross section of the basic structural arrangement of a commercial aircraft cabin window. The support structure 10 typically provides an angled sealing surface 12 which receives a mating sealing surface 14 of the cabin window 16. The interface of the structure to the window for this embodiment is ideally a knife edge, however, as shown in the drawings, actual dimensional limitations result in a blunt edge 18 with resulting mold line variation on the exterior aerodynamic surface of the fuselage. The cabin window and supporting structure constitute a portion of the pressure vessel created by the aircraft fuselage. In an exemplary configuration the structural requirements for integrity of the pressure vessel result in a window thickness, A, of 0.350±0.015 inches. A minimum thickness of 0.280 inches provides tolerancing for repair of the window as will be described subsequently.

An alternative design of the window is shown in FIG. 1B wherein the knife edge 18 if FIG. 1A and the associated obtuse angle vertex 20 on the window are replaced by a breakout point arrangement wherein the structure employs a blunt nose 22 mating with the breakout point 24 on the window. The second embodiment relieves the dimensional constraints required in attempting to match the knife edge and vertex point to avoid aerodynamic irregularities in the assembled configuration.

Damage due to chemical attack, crazing, scratching, pitting or erosion of the exterior surface 26 of the window is repaired by grinding and polishing the exterior surface of the window to redeem the desired visual quality. In the configuration of FIG. 1A the amount of material machined from the external surface 26 must also be removed from the mating surface 14 to retain the exterior mold line and avoid aerodynamic imperfections. In the embodiment of FIG. 1B, while machining of the mating surface 14 may be required in addition to machining of the exterior surface the dimensional requirements are significantly relaxed due to the ability to shim the mating surfaces to achieve the desired mold line tolerance.

A first embodiment of the present invention is shown in FIG. 2. For refurbishment of a window with a damaged outer surface, the surface is machined down by approximately 0.050 inches from original tolerances to accommodate an erosion protection layer 30 and a urethane interlayer 32. The present invention accommodates replacement of original production windows without impacting the overall design. Present embodiments of the invention employ a 0.025 inch chemically strengthened soda lime glass outer protective layer laminated to the window surface with a 0.015 inch urethane interlayer. For window configurations without extreme compound contours, the glass outer protective layer is elastically formed for lamination to the exterior surface of the acrylic window. Employing the dimensions for the exemplary embodiment of the cabin window previously described, machining of the window from original tolerances to approximately 0.300±0.010 inches, or for a new window, using reduced thickness sheet material of this dimension, accommodates the present invention within mold line tolerances. This structural thickness further allows sufficient margin over the minimum thickness for the window.

A seal 34 is created around the edge of the outer protective layer and urethane interlayer laminate to aerodynamically fair the laminate and protect the erosion layer from edge impact.

In the embodiment disclosed herein, the glass outer protective layer comprises a chemically strengthened soda lime float glass having a thickness, B, of 0.025 inches. The urethane interlayer comprises urethane sheet produced by Sierracin under part number S123 having a thickness, C, of 0.015 inch. The selected thickness of the urethane provides sufficient thickness, adhesion and shear strength to resist thermal stresses between the acrylic window and glass outer protective layer without delamination. The interlayer is sufficiently thin, however, to avoid excessive deflection of the glass for impact resistance. In the present embodiment, the glass is chemically strengthened providing a compression layer of approximately 0.001 to 0.002 inches. Thermal strengthening of the glass is not possible due to its lack of thickness.

In a refinement to the basic process employed in creating the present laminate for the invention, the lamination of the glass outer protective layer to the acrylic window with the urethane interlayer is accomplished employing a hot lamination process. During hot processing, the acrylic has a significantly greater expansion than the glass outer protective layer. Consequently, upon cooling the glass layer is placed in compression causing the window laminate to bow slightly outward. The resulting configuration places the glass outer protective layer in complete compression throughout its thickness thereby enhancing the chemical strengthening of the glass and avoiding potential crack initiation from deep scratches penetrating the chemical compression layer thickness. This attribute can be varied beneficially with proper selection of lamination temperature and contour restraint. In the embodiment disclosed herein a processing time of approximately 2 hours at 180 degrees F. at a pressure of 75 psi has produced satisfactory results.

Windows in service in the aircraft typically acquire bowed shape during pressurization. The bowing effect created in the laminating process for the present invention does not exceed the tolerance allowable for window bow during pressurization and the added stiffness of the glass/acrylic laminate avoids exceeding the maximum allowable bow during pressurization.

FIG. 5 demonstrates yet a further refinement of the present invention which adds an inner balancing layer 31, of substantially the same thickness as the outer protective layer, bonded to the inner surface of the window 27 with a second interlayer 33, of substantially the same thickness as the interlayer bonding the outer protective layer. A seal 35 is employed with the inner lamination to prevent moisture ingress. Hot processing of the window in the embodiment of FIG. 5 results in mutual compensation of stresses created by the inner and outer layer to avoid or minimize bowing of the window while providing the benefit of maintaining both layers in compression for impact resistance. The thin inner balancing layer is easily accommodated within the structural tolerances of the window assembly and does not affect the aerodynamic mold line. This embodiment provides a significant gain in the stiffness and operating strength of the window and enhances aerodynamics of the installation by eliminating preset bowing present in the single outer layer embodiment. Additional protection from scratching, crazing, moisture absorption or other damage to the inner surface of the window provides a supplemental benefit.

In the present embodiments, a urethane compatible polysulfide sealant is employed to create the fairing and edge protection for the protective laminate. In the preferred embodiment, Products Research PR1829 sealant has provided satisfactory performance, and further enhances the product over conventional designs by providing protection of the machined edge to prevent in-plane cracking from transverse tensile stresses due to surface drying of moisture-swollen acrylic.

In the embodiments disclosed in the drawings the urethane interlayer is terminated short of the edge 36 of the glass outer protective layer. In demonstrated embodiments a set back, D, of approximately 0.10 inches provides a faying surface protected from weathering, deterioration and erosion of the sealant to preclude peeling. This configuration of the sealant also eliminates edge effects such as glass chipping and interlayer peeling. In addition to creating a fairing as shown in FIG. 2 the sealant is employed in alternate embodiments to create a shim layer 36 for the sealing surface 14 on the window. As previously described for most repair processes on windows employing the knife edge structural arrangement, the sealing surface is machined to maintain proper dimensioning of the window and structure to avoid aerodynamic impact to the mold line. Extending the sealant down the edge of the sealing surface of the window as shown in FIG. 3, allows modification of the window with the present invention to achieve tolerances substantially identical to the original production window.

In a third embodiment shown in FIG. 4, the sealant configuration allows recreation of a breakout point 40 thereby avoiding remachining of the breakout point in the original acrylic window. This simplifies the machining process further enhancing the desirability of the present invention as a repair.

Figure 6:
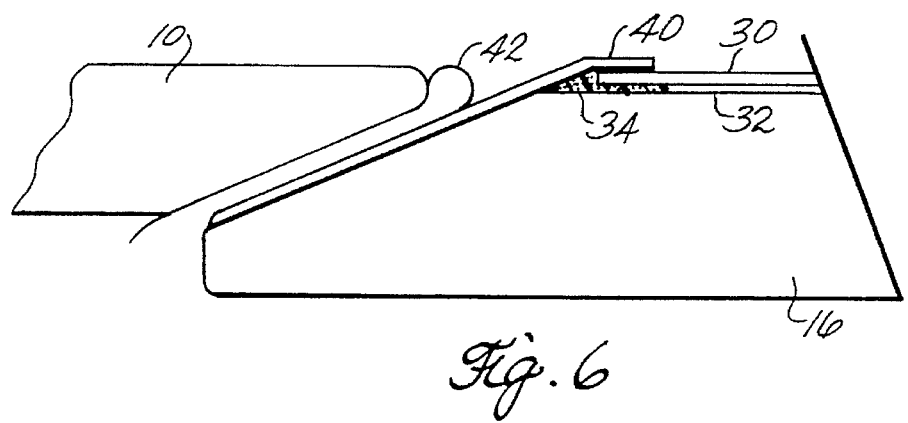
FIG. 6 is a cross-sectional view demonstrating an embodiment of the present invention employing a blended Z-strip.
Figure 7:
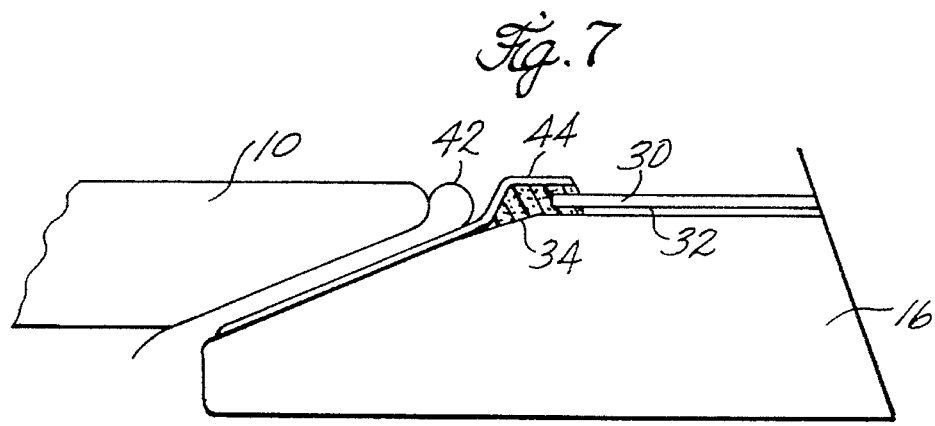
FIG. 7 is a cross-sectional view demonstrating an embodiment of the present invention employing an Island Z-strip.

The present invention is equally applicable to aircraft windshields and cockpit side windows of acrylic construction. Thin sheet glass available in 0.025 inch and 0.040 inch thicknesses can be employed for such embodiments. Supplementing of the sealant fairing with a rigid metallic or plastic Z-strip such as aluminum, stainless steel or fiberglass for a clamping effect, better sealing and additional impact protection on the edges of the glass outer protective layer can be implemented particularly on aerodynamic leading edges. FIGS. 6 and 7 disclose embodiments of the invention employing various Z-strip designs. FIG. 6 shows a blended Z-strip 40 interfacing with the window structural seal 42 while FIG. 7 shows an Island Z-strip 44.

The present invention provides a replacement for current production windows and significant enhancement over prior art refurbishment techniques. The invention avoids or minimizes impact to the aerodynamic mold line and minimum weight differential, which on cabin windows of the exemplary embodiment is approximately 0.16 pounds providing an extremely attractive repair solution.

Figure 8:
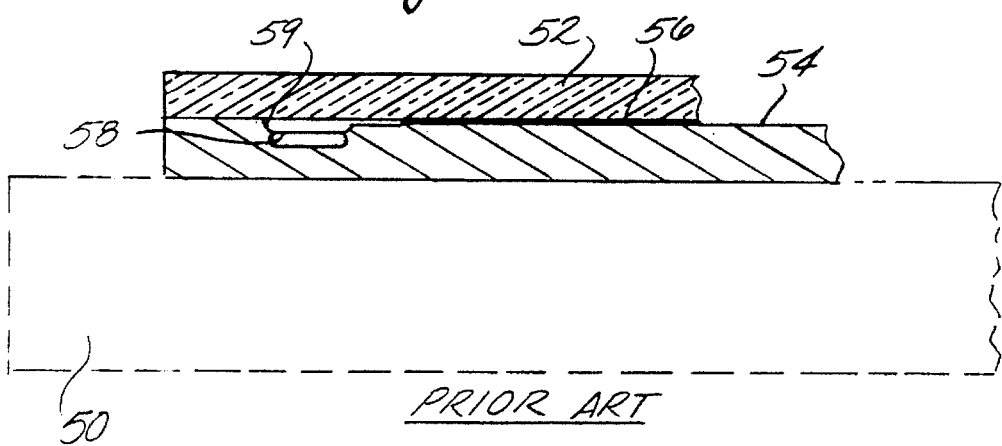
FIG. 8 is a cross-sectional view demonstrating a typical prior art configuration for a laminated aircraft windshield with anti-icing element.

FIG. 8 demonstrates a typical prior art windshield configuration employing a conventional monolithic glass faceply and an anti-ice element. An outer structural ply 50 is shown in phantom. It should be recognized that an aircraft windshield may employ other structural plies as required by strength and design considerations. A glass face ply 52 of approximately 0.12 inches thickness is laminated to the outer structural ply with an adhesive interlayer 54 of approximately 0.10 inches. In more complex windshields the outer glass face ply is heated using an electrical element 56 for anti-icing. Power for the anti-ice element is provided through a bus bar 59 and braid 58 which is accommodated in the adhesive interlayer. Connection of the braid to the anti-ice element is typically accomplished in the form of a bus bar 59. The total face ply laminate thickness for this type of prior art design is approximately 0.220 inches. Use of conventional glass for the face ply and urethane for the inter layer results in an areal density of approximately 0.0145 pounds for square inch.

Figure 9:
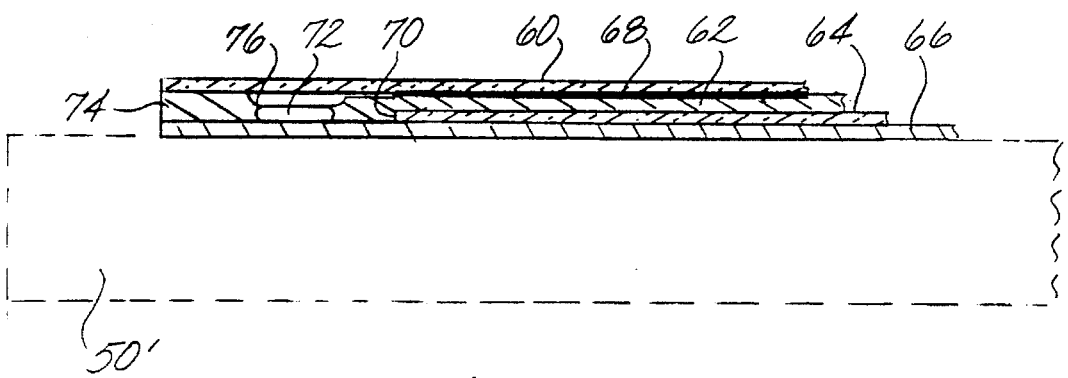
FIG. 9 is a cross-sectional view of an embodiment of the present invention employing a face ply laminate incorporating thin glass layers with varying lateral dimensions and thin adhesive interlayers.

The present invention is shown in FIG. 9. A conventional outer structural ply 50' is employed for the windshield. The face ply laminate of the present invention comprises a first outer face ply 60 of thin chemically strengthened glass having a thickness of approximately 0.026 inches. A first interlayer 62 of urethane or other suitable adhesive having a thickness of approximately 0.015 inches supports the outer glass face ply. Thickness of the interlayer is determined to provide comparable thickness with the outer glass layer to prevent excessive deflection upon impact and to provide adequate hail resistance.

A second glass ply 64 of thin chemically strengthened glass again having a thickness of approximately 0.026 inches is laminated to the inner interface of the first interlayer. A second interlayer 66 of urethane or other suitable adhesive having a thickness of approximately 0.015 inches is employed to laminate the face laminate structure to the outer structural ply of the windshield. The comparable thickness of the second interlayer to the second glass layer thickness and the relative thickness of the two glass layers and two interlayers prevents excessive impact deflection. Chemical strengthening of the glass provides strength necessary for pressurization stress and for hail impact resistance.

Processing of the laminated glass face ply of the present invention is accomplished by preparing a prelaminate comprising the first glass ply, first interlayer and second glass ply. The prelaminate is placed on a tool and, when required, elastically formed to a curved tool which approximates the shape of the plastic structural plies to which the laminated face ply will be joined. Standard vacuum bagging technology in combination with the curved tool, provides sufficient forming capability due to the high elasticity of the extremely thin glass layers. Hot processing of the prelaminate at 205° to 275° F. has been demonstrated experimentally to provide the desired prelaminate configuration.

The prelaminate is then laminated to the plastic structural plies of the windshield with the second urethane interlayer in a second hot process cycle employing vacuum bagging. The ability to elastically form the face ply laminate in the manner described eliminates the tooling and processing complexity required for preforming thick glass face plies in the prior art. In addition, elastically forming the thin glass prelaminate eliminates optical distortions often created during preforming of thick glass face plies using conventional methods.

In an alternative process for the present invention, the second urethane interlayer maybe included in the prelaminate and a mylar or other suitable release film employed to separate the prelaminate from the tool surface. A deairing texture can be applied to the urethane layer by employing a scrim layer intermediate the mylar and tool. This alternative process precludes the necessity for handling of multiple layers in more than one processing step and assures adequate thickness to accommodate the bus bar and braid.

As a second alternative for processing of the laminated face ply of the present invention, a lay-up comprising the outer glass face ply, first interlayer, inner glass ply and second urethane interlayer is created and elastically formed directly to the preformed plastic structural layers for co-curing in a single laminating process.

Anti-icing capability is accommodated in the present invention with an electrical heating element 68 applied to the inner surface of the outer glass ply. The inner glass ply terminates at an edge 70 providing a lateral dimension less than the outer glass ply by approximately 0.5". A braid or conductor 72 providing power to the anti-ice element is accommodated outboard of the second or inner glass ply and a urethane ring or a thickened peripheral portion 74 in either the first or second interlayer provides continuity in the laminate. A bus bar 76 for attachment of the braid to the anti-ice element is also accommodated within the thickened portion of the interlayer.

Application of the electrical heating element to the inner surface of the outer glass ply, significantly reduces any stress induced by the plastic structural plies on the coating comprising the heating element. The outer portion of the face ply laminate comprising the outer glass layer, heating element, first interlayer and second glass ply creates a substantially stress free environment for the electrically conductive coating thereby significantly reducing the likelihood of failure during assembly processing or in service. The second interlayer accommodates substantially all thermal stresses imposed on the face ply laminate by the plastic structural plies of the windshield due to thermal expansion in assembly processing and in service and deflection of the windshield due to pressurization of the aircraft in operational service.

The overall thickness of the laminate of the present invention is approximately 0.082 inches. This provides an areal density of approximately 0.0058 pounds per square inch resulting in a significant weight improvement over the prior art designs. In addition, the thin glass face ply allows greater effectiveness of the anti-ice element due to significantly lower thermal mass and higher thermal conductivity of the face ply.

The weight advantage of the present invention is demonstrable by an exemplary windshield replacement for the Canadair Challenger aircraft. In an original configuration the Challenger employs a windshield having an as-cast acrylic face ply with a thickness of 0.056" laminated to the structural plies with a 0.10" urethane interlayer. This original equipment windshield is heated and the thickness is dictated by anti-icing heat transfer considerations, and is so thin that the relatively brittle and weak as-cast acrylic is vulnerable to cracking. Weight of the acrylic face ply and 0.10" urethane interlayer is 4.18 pounds. Replacement of the acrylic face ply and interlayer with a standard prior art thick glass face ply with heating elements employing three millimeter glass and a 0.10" interlayer provides a weight of 10.16 pounds or a weight increase of 5.98 pounds over the conventional windshield. Replacing the acrylic face ply with a laminated outer ply employing the present invention with heating results in weight of approximately 3.86 pounds for a net weight saving of 0.32 pounds. The present invention allows substitution of the preferred glass faceply with a net weight saving for this example and, in the general case, without any weight penalty.

Having now described the invention as required by the patent statutes those skilled in the art will recognize modi- fications and substitutions to the elements of the embodiments disclosed herein. Such modifications and substitutions are within the scope of the present invention as defined in the following claims.

What is claimed is:

1. A laminated face ply for aircraft windshields comprising:

an outer glass face ply having a first thickness of about 0.026 inches;

an inner glass ply having a thickness substantially identical to said outer ply;

a first urethane interlayer having a second thickness, said first urethane layer bonding said outer face ply to said inner ply, the second thickness sufficient to allow the urethane interlayer to accommodate thermal stresses arising between the outer ply and the inner ply and said second thickness sufficiently thin to limit deflection of the outer ply for impact resistance; and a second urethane interlayer bonding said inner glass ply to an outer surface of a structural ply of the windshield and having a thickness substantially identical to said first urethane interlayer to accommodate thermal stresses arising between the inner glass ply and the structural ply of the windshield and limit deflection of the inner ply for impact resistance.

2. A laminated face ply as defined in claim 1 wherein the inner glass ply has a lateral dimension less than that of the outer glass ply and the first urethane interlayer includes a thickened peripheral portion encompassing the inner glass ply for continuity of the laminate and further comprising:

an anti-icing element mounted to an inner surface of the outer glass ply; and a conducting braid embedded in the thickened portion of the first interlayer and electrically connected to the anti-icing element.

3. A laminated face ply as defined in claim 1 wherein the outer glass ply and inner glass ply are chemically strengthened glass.

4. A method for aircraft windshield assembly comprising the steps of:

preforming a plastic structural laminate for the windshield;

laying up a prelaminate of an outer glass layer of thin chemically strengthened glass having a thickness of about 0.026", a first urethane interlayer having a second thickness of about 0.015", and an inner glass ply having a thickness substantially identical to said outer ply;

elastically forming the prelaminate to a tool having a curvature substantially the same as the preformed plastic structural laminate;

hot processing the prelaminate;

creating a second lay-up employing the prelaminate, a second urethane interlayer of about 0.015" and the preformed structural plastic laminate; and laminating the second lay-up to complete the windshield assembly;

5. A process for manufacturing laminated aircraft windshields comprising the steps of:

preforming a plastic structural laminate;

laying up a prelaminate comprising an outer glass face ply having a thickness of about 0.026", a first urethane interlayer having a thickness of about 0.015", an inner glass ply having a thickness substantially identical to the outer glass ply, a second urethane interlayer having a thickness substantially identical to the first urethane interlayer;

elastically forming the prelaminate to a curved tool having a curvature substantially identical to the preformed plastic structural laminate employing a release layer intermediate the inner urethane layer and the tool;

hot processing the prelaminate;

removing the prelaminate from the tool and removing the release layer;

assembling the prelaminate to the preformed plastic structural laminate; and laminating the assembled prelaminate and plastic structural laminate to produce a completed windshield.

6. A method for manufacturing a laminated aircraft windshield comprising the steps of:

preforming a plastic structural laminate;

laying up a laminated face ply comprising an outer glass face ply having a thickness of about 0.026", a first urethane interlayer having a thickness of about 0.015", an inner glass ply having a thickness substantially identical to said outer ply and a second urethane layer having a thickness substantially identical to said first urethane interlayer;

elastically forming the lay-up to the preformed structural plastic laminate and laminating the elastically formed lay-up and plastic structural laminate to form a completed windshield.

7. A method for manufacturing a laminated aircraft windshield as defined in claims 3, 4, or 5 including the steps of:

depositing a conductive heater coating on an interior surface of the outer glass face ply and connecting a bus bar and conducting braid to the heater coating prior to lamination of the outer glass face ply.

* * * * *